United States Patent
Schweiger

(10) Patent No.: US 6,870,853 B1
(45) Date of Patent: Mar. 22, 2005

(54) DEVICE AND METHOD FOR CONVERTING DATA SEQUENCES BETWEEN FR FORMAT AND ATM FORMAT

(75) Inventor: Ludwig Schweiger, Hilgertshausen-Tandern (DE)

(73) Assignee: Siemens AG (DE)

( * ) Notice: Subject to any disclaimer, the term of this patent is extended or adjusted under 35 U.S.C. 154(b) by 0 days.

(21) Appl. No.: 09/622,564

(22) PCT Filed: Feb. 8, 1999

(86) PCT No.: PCT/DE99/00328

§ 371 (c)(1),
(2), (4) Date: Aug. 18, 2000

(87) PCT Pub. No.: WO99/43183

PCT Pub. Date: Aug. 26, 1999

(30) Foreign Application Priority Data

Feb. 20, 1998 (DE) ......................... 198 07 251

(51) Int. Cl.[7] .............................................. H04Q 11/04
(52) U.S. Cl. ...................... 370/412; 370/395.1; 370/466
(58) Field of Search ................................ 370/395, 397, 370/400, 401, 409, 352, 466, 355

(56) References Cited

U.S. PATENT DOCUMENTS

| | | | |
|---|---|---|---|
| 5,315,588 A | | 5/1994 | Kajiwara et al. |
| 6,205,152 B1 | * | 3/2001 | Von Ahnen et al. ..... 370/395.63 |
| 6,226,260 B1 | * | 5/2001 | McDysan .................... 370/216 |
| 6,252,887 B1 | * | 6/2001 | Wallace ........................ 370/466 |
| 6,370,138 B1 | * | 4/2002 | Kim et al. .................... 370/353 |

FOREIGN PATENT DOCUMENTS

EP    0 775 958    5/1997

OTHER PUBLICATIONS

PCI Local Bus Technical Summary (techfest.com).*
Bih–Hwang Lee, "A Performance Study on Frame Relay and ATM Interworking Unit and Its Applications: Connectionless Data Service and VPN", IEICE Trans. Communication, vol. E80–B, No. 6 Jun. 1997, XP–000723073, pp. 948–961.
Rathgeb, Wallmeier, ATM Infrastruktur für die Hochleistungskommunikation, p. 79; pp. 269–271.

* cited by examiner

Primary Examiner—Chi Pham
Assistant Examiner—Derrick W Ferris
(74) Attorney, Agent, or Firm—Fish & Richardson P.C.

(57) ABSTRACT

A device for converting data sequences between FR format and ATM format comprises an FR communication module (PIM) for connecting to an FR communication link, an ATM communication module for connecting to an ATM communication link, a central computer (FP) for controlling the FR communication module and the ATM communication module and a buffer memory (PSSM), which is connected via an internal communication link to the central computer (FP), the FR communication module, and the ATM communication module. The communication data, which are to be converted from the FR format into the ATM format and vice-versa, are respectively temporarily stored in the buffer memory (PSSM), and the operation of the central computer (FP) is not interrupted by the readin/readout process of the data into/from the buffer memory. This results in an increased transmission performance of the conversion device.

26 Claims, 5 Drawing Sheets

DEVICE AND METHOD FOR CONVERTING DATA SEQUENCES BETWEEN FR FORMAT AND ATM FORMAT

BACKGROUND OF THE INVENTION

1. Field of the Invention

The invention relates to a device and associated method for converting data sequences between a frame relay (FR) format and an asynchronous transfer mode (ATM) format.

2. Description of the Related Art

The asynchronous transfer modus (ATM) serves as a basis for a universal and international broadband communication, whose configuration standardized by means of the ATM forum found in the year 1991. The asynchronous transfer modus is an asynchronous time-division multiplexer method, which enables an integration of different communication services, such as voice communication, data communication, video telephone, video communication etc. given an arbitrary scaling ability of the transmission capacity. The structure of a typical ATM cell is represented in Rathgeb, Wallmeier, page 79, for example.

Network accesses having transmission rates of 64 kbit/s up to 45 Mbit/s are enabled by means of "Frame Relay", whereby the data frames can have a variable length up to 8 kbytes. FR network accesses are particularly suitable for the communication e.g., in the Internet. The specifications are standardized by means of the FR forum. The structure of an FR frame is described in Rathgeb, Wallmeier, page 269 through page 271, for example.

The conversion of data sequences between FR and ATM format ("interworking") can be carried out as a "network interworking," in which the FR frames are directly converted into corresponding ATM frames and vice-versa or can be carried out by means of a "service interworking", whereby the content of the FR frames are converted into an AAL5 (ATM adaption layer 5) cell stream. The network interworking is described in FR forum document No. FRF. 5 and the service interworking is described in FR forum document No. FRF. 8.

Given the transmission from one format to the other one, the frames must be frequently translated in their control data area (header), particularly regarding the service interworking. For this purpose, the frames of an FR connection that are supplied via the interfaces are stored in the main memory of the central computer (frame processor FP) of the conversion device. For this purpose, the central computer reads in the data from the appertaining interface (such as E1/DS1 in the FR interface module) by means of read commands or by means of a direct memory access (DMA). Subsequent to the processing by means of the central computer, the frames are given to a further processing interface, such as an ATM communication module (segmentation and reassembly sublayer SAR), by means of write commands or by means of a direct memory access. This method has the disadvantage that the central computer cannot continue to work and that the program running on it must be interrupted during the transmission of the data to and from the main memory of the central computer. Therefore, the throughput rate of the conversion device is significantly reduced. Long FR frames hold up the central computer with waiting times as much as short FR frames intensively load it with respect to the processing time.

SUMMARY OF THE INVENTION

Therefore, the invention based on the object of proposing a device and a method for converting data sequences between FR format and ATM format, in which, throughput rate is increased.

The object is achieved by a conversion device, which comprises an FR communication module for connecting to an FR communication link, an ATM communication link, a central computer for controlling the FR communication module and the ATM communication module and a buffer memory, which is connected to the central computer, the FR communication module and the ATM communication module via an internal communication link.

Given the conversion of the data sequences from FR into the ATM format and vice-versa, the data (usage data and control data) are not stored in the memory of the central computer but in the buffer memory, which is connected to the FR communication module and the ATM communication module via a separate internal communication link. As a result, the operation of the central computer need not be interrupted during the readin and readout of the data. Therefore, the data throughput rate is clearly increased. The process of the data transmission between the communication modules and the buffer memory is also controlled via the central computer. However, this control function contributes only to a small increase in work load of the central computer.

Preferably, the communication modules, the buffer memory and the central computer are connected via a bus link, particularly via a high-capacity PCI bus. A separate bus link can also be provided for each of the communication modules.

For purposes of achieving a further increase of the throughput rate, it is possible to divide the buffer memory into two units, whereby one unit is fashioned for storing the data for the further processing in the FR communication module and the other unit for storing data for the further processing in the ATM communication module. The utilization of two separate central computers is an advantageous arrangement, in which each computer is respectively responsible for one "communication direction".

BRIEF DESCRIPTION OF THE DRAWINGS

Exemplary embodiments of the present invention are described on the basis of the enclosed drawings.

DESCRIPTION OF THE PREFERRED EMBODIMENTS

Figure 1:
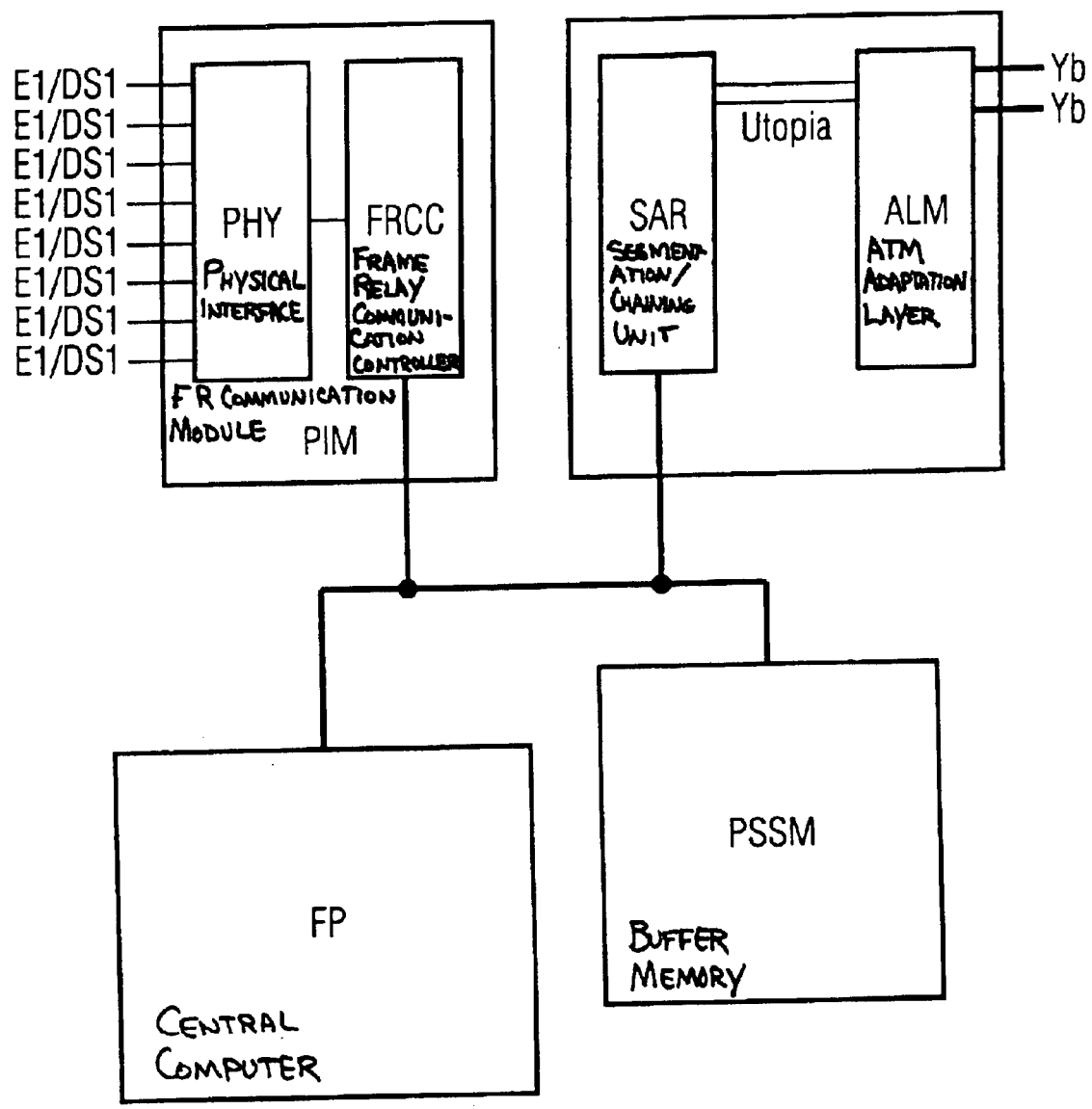
FIG. 1 is a schematic representation of a first exemplary embodiment of the inventive conversion device.

FIG. 1 shows a first exemplary embodiment of the inventive conversion device. In this example, eight communication links of the type E1/DS1 (transmission capacity 2.048 Mbit/s or, respectively, 1.544 Mbit/s are connected to the FR communication module. However, arbitrary other communication links that are possible in the FR standard can be utilized. The FR communication module PIM (Physical Interface Module) consists of two functional modules, the physical interface PHY and the FR control FRCC (Frame Relay Communication Controller). The FR communication module PIM is connected via a PCI (Peripheral Component Interconnect) bus to the ATM communication, which, in turn, consists of the segmentation/chaining unit SAR by which the AAL5 (ATM Adaption Layer) functionality is implemented within, and consists of the ATM adaptation layer ALM, which are connected to one another via a utopia (Universal Test and Operations Physical Interface for ATM) interface. The buffer memory PSSM (PIM SAR Shared Memory), which comprises a dynamic direct access memory (DRAM) and an appertaining memory controller, is also connected to the PCI bus. Besides, the central computer FP, which, for example, can comprise a RISC CPU, a system control, a storage unit, a clock control etc., is connected to the PCI bus.

Figure 2:
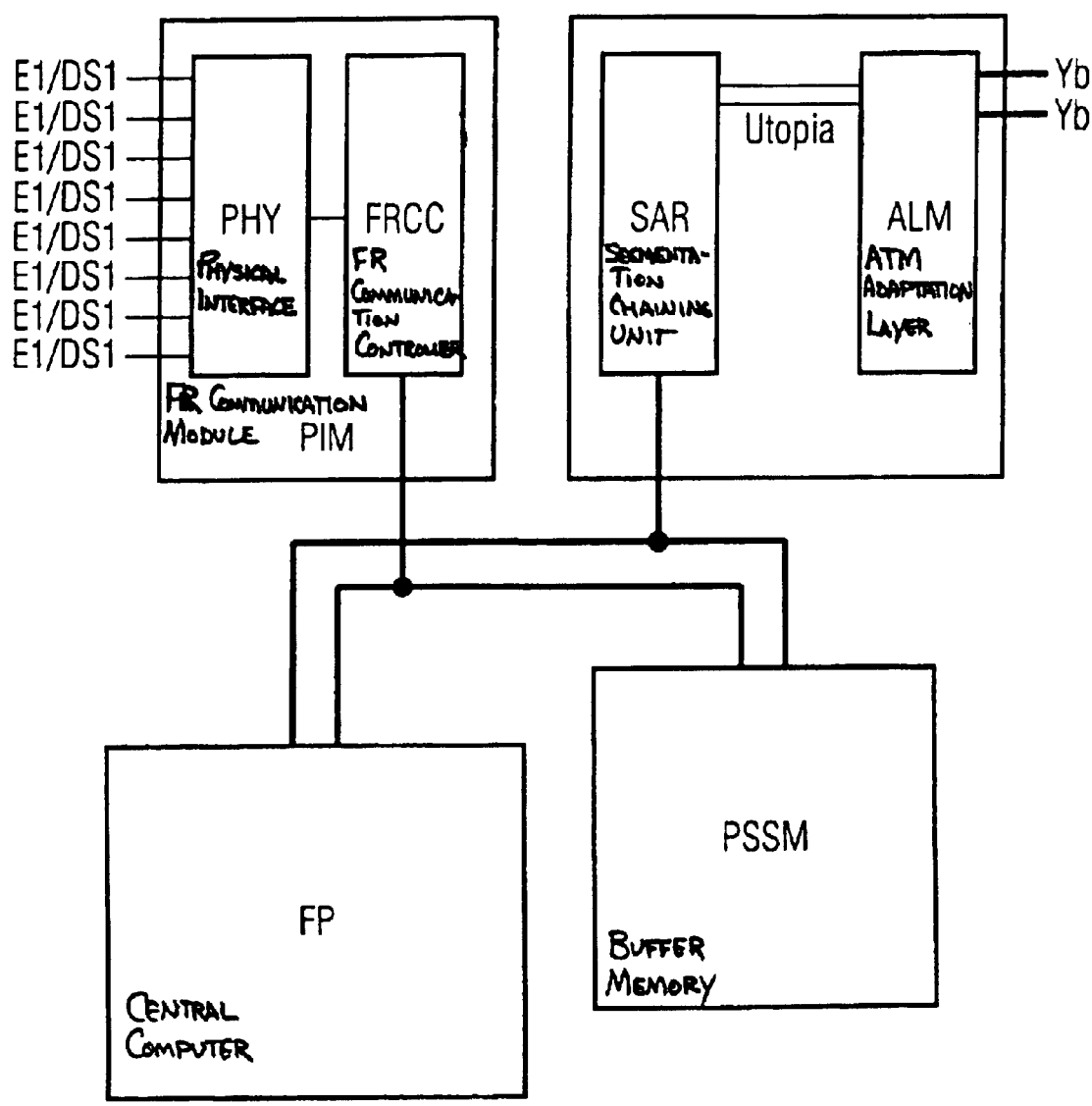
FIG. 2 is a schematic illustration of a second exemplary embodiment of the inventive conversion device.

The second exemplary embodiment of the inventive conversion device shown in FIG. 2 only differs from the first exemplary embodiment in that separate bus links are provided between the FR communication module and the buffer memory, on one hand, and between the ATM communication module and the buffer memory, on the other hand. Both bus links are connected to the central computer FP, which controls the data transmission processes on the bus links.

Figure 3:
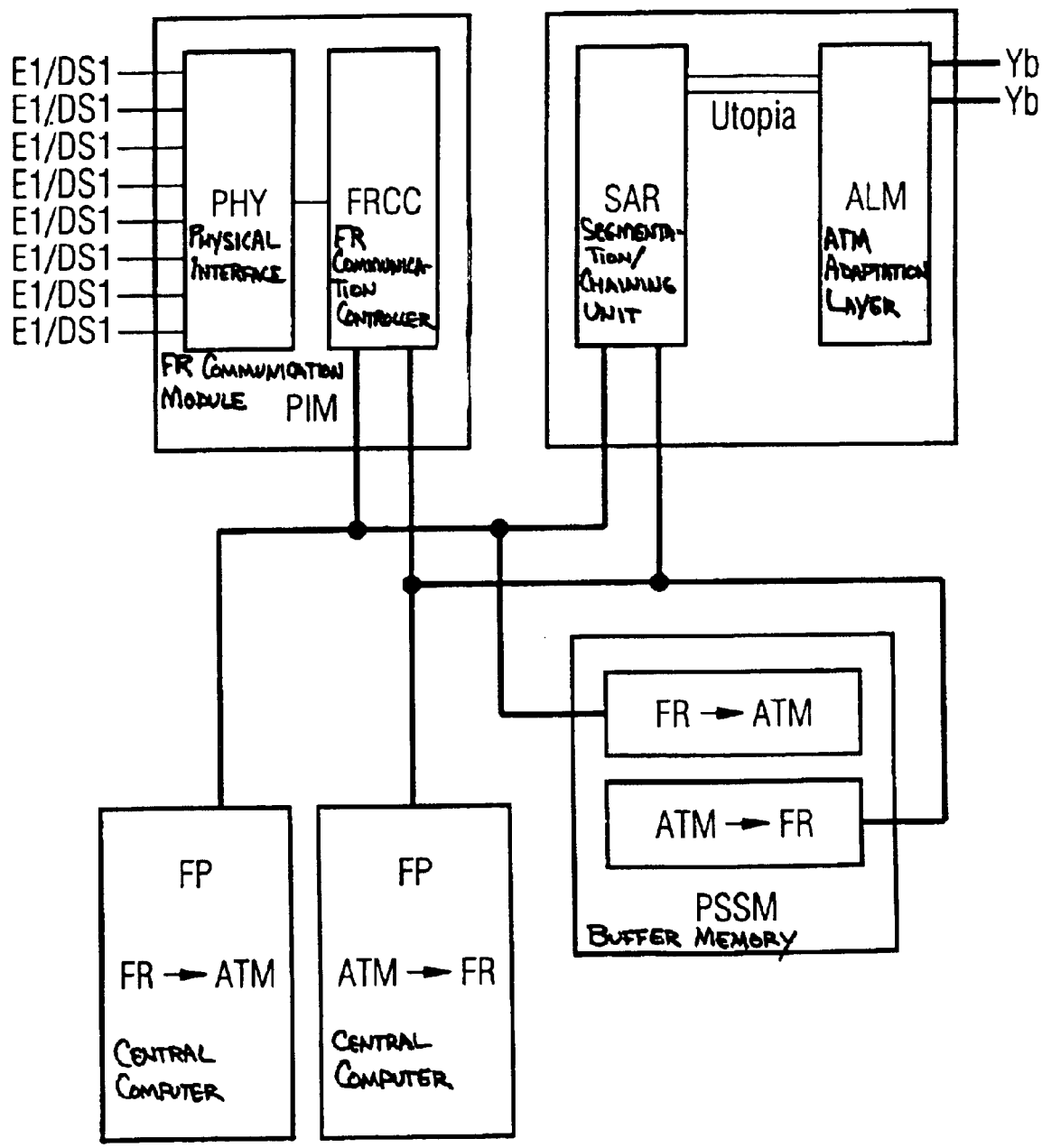
FIG. 3 is a schematic illustration of a third exemplary embodiment of the inventive conversion device.

In the third exemplary embodiment of the inventive conversion device schematically shown in FIG. 3, the buffer memory PSSM is divided, into two units for purposes of further enhancing the performance, in which the first unit serves the purpose of transmitting from the FR side to the ATM side and the second unit serves the purpose of transmitting from the ATM side to the FR side.

Figure 4:
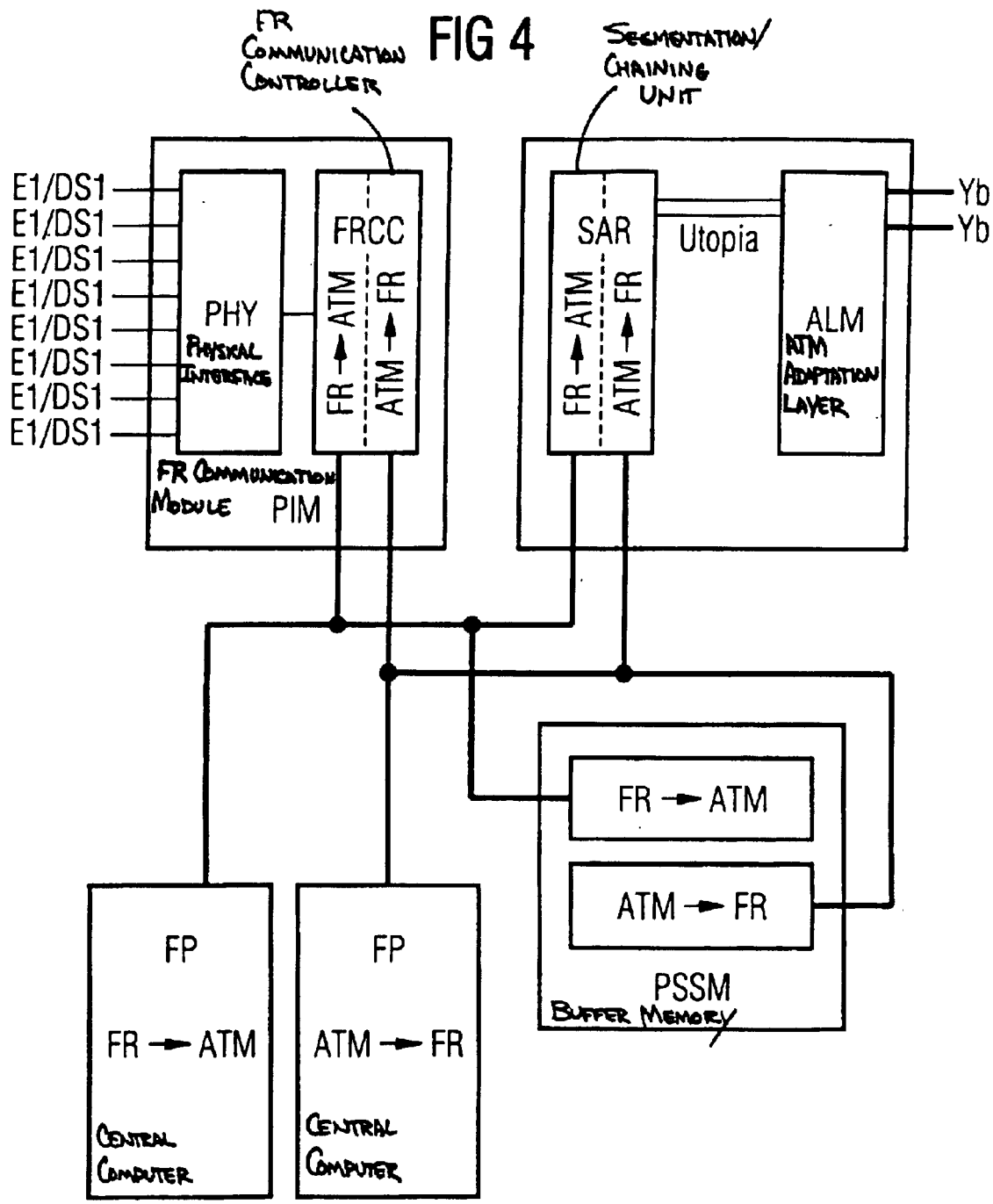
FIG. 4 is a schematic representation of a fourth exemplary embodiment of the inventive conversion device and FIG. 5 is a schematic representation of a fifth exemplary embodiment of the inventive conversion

In the fourth exemplary embodiment of the inventive conversion device shown in FIG. 4, the FRCC module in the FR communication module PIM and the SAR module in the ATM communication module are also fashioned in a two-piece manner, in which each respective part is responsible for one transmission direction. Therefore, a further increase in speed can be achieved, but the constructional outlay increases, too.

Figure 5:
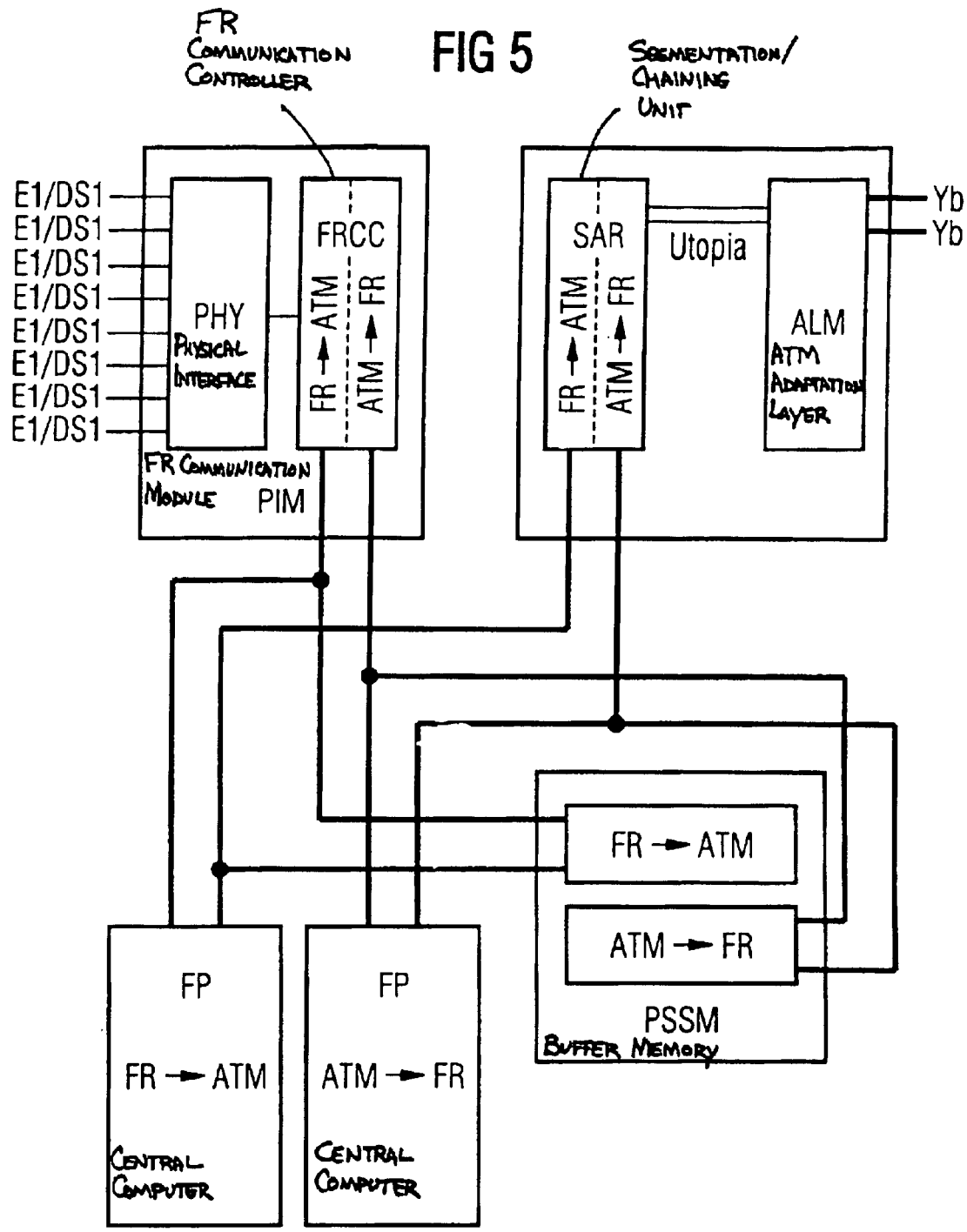

The conversion device of the third exemplary embodiment, which is shown in FIG. 5, additionally contains separate bus links for the readin process into the buffer memory PSSM, on one hand, and for the readout process from the buffer memory, on the other hand. For both transmission directions, the readin and readout process therefore can be carried out independently of one another, so that a further enhancement of the transmission performance is enabled.

The method of functioning of the conversion devices that are schematically shown in FIGS. 1 through 3 is explained in the following. FR data sequences are read from the physical interfaces by the FR communication module PIM and then are stored in the buffer memory PSSM upon control by means of the central computer FP. Subsequently, the data are read-in the ATM communication module, upon control via the central computer again, via the PCI bus. The segmentation/chaining unit SAR carries out the interconnecting of the header data and the chaining of the data to be transmitted into ATM cells, which are supplied via the utopia interface of the ATM adaptation layer—processing unit ALM and are made available there at output terminals $Y_b$, for the further processing in a coupling field, for example.

Given the reversed conversion, the data sequences get in the ATM format from the ATM adaptation layer—processing unit, via the utopia interface, to the segmentation chaining unit SAR, in which the ATM cells are chained and are stored via the bus link into the buffer memory PSSM. From there, the data are read-in via the FR communication module PIM, are converted into the FR format with frames of variable length, and are subsequently supplied to one of the physical interfaces.

As a result of the temporary storing of the converted data via the internal communication link in the buffer memory, an interruption of the operation of the central computer FP is not required when the data are readin/readout. The control of the readin/readout process, on one hand the translation of the FR headers in the network IW case and, on the other hand, the conversion in the service IW case requires only a few accesses via the PCI bus and therefore represents only a small load for the central computer. Thus, a performance enhancement of the conversion device by a factor of 2 through 3 and higher can be achieved.

The PCI burst capability of all connected PCI bus users and also the performance capacity of the central computer FP are conditions with respect to a high transmission performance. Although the central computer FP does not access the buffer memory PSSM too often, its conversion speed must be high given the service interworking functionality.

The above-described method and device are illustrative of the principles of the present invention. Numerous modifications and adaptions thereof will be readily apparent to those skilled in this art without departing from the spirit and scope of the present invention.

What is claimed is:

1. A device for converting data sequences between frame relay (FR) format and asynchronous transfer mode (ATM) format, comprising:

an FR communication module for connecting to at least one FR communication link;

an ATM communication module for connecting to an ATM communication link;

a central computer for controlling said FR communication module and said ATM communication module; and buffer memory, which is connected via an internal communication link to said central computer, said FR communication module and said ATM communication link, the buffer memory comprising at least one memory that stores both FR data sequences from the FR communications module and ATM data sequences from the ATM communications module, at least one of the FR data sequences and the ATM data sequences comprising usage data and control data.

2. A device according to claim 1, wherein said internal communication link comprises a bus link.

3. A device according to claim 2, wherein said bus link comprises a Peripheral Component Interconnect (PCI) bus link.

4. A device according to claim 1, wherein said internal communication link comprises two separate bus links for driving said FR communication module.

5. A device according to claim 1, wherein said central computer controls data transmission between said FR communication module, said ATM communication module, said central computer and said buffer memory.

6. A device according to claim 1, wherein said buffer memory comprises a reception unit and a transmission unit.

7. A device according to claim 6, further comprising an additional central computer which controls conversion of data sequences from the FR format into the ATM format.

8. A method for converting data sequences from a frame relay (FR) format into an asynchronous transfer mode (ATM) format, the method comprising:

connecting an FR communication module to an FR communication link;

connecting an ATM communication module to an ATM communication link;

controlling, with a central computer, said FR communication module and said ATM communication module;

readin FR data sequences into said FR communication module as read-in data;

storing said read-in data in a buffer memory;

converting stored read-in data into ATM format; and reading-out said stored read-in data as read-out data converted into ATM format via said ATM communication module;

wherein reading-in read-in data into the buffer memory or reading-out read-out data from the buffer memory does not interrupt an operation of the central computer, and wherein the buffer memory comprises at least one memory that stores both FR data sequences and ATM data sequences, at least one of the FR data sequences and the ATM data sequences comprising usage data and control data.

9. A method for converting data sequences from an asynchronous transfer mode (ATM) format into a frame relay (FR) format comprising:

connecting an FR communication module to an FR communication link;

connecting an ATM communication module to an ATM communication link;

controlling, via a central computer, said FR communication module and said ATM communication module;

reading-in and desegmenting an ATM data sequence in said ATM communication module as read-in data;

storing said read-in data in a buffer memory;

converting stored read-in data into FR format; and reading out said stored read-in data as read-out data converted into FR format from said buffer memory via said FR communication module;

wherein reading-in read-in data into the buffer memory or reading-out read-out data from the buffer memory does not interrupt an operation of the central computer, and wherein the buffer memory comprises at least one memory that stores both FR data sequences and ATM data sequences, at least one of the FR data sequences and the ATM data sequences comprising usage data and control data.

10. A device for converting data sequences between frame relay (FR) format and asynchronous transfer mode (ATM) format, comprising:

an FR communication module for connecting to at least one FR communication link;

an ATM communication module for connecting to an ATM communication link;

a central computer for controlling said FR communication module and said ATM communication module; and a buffer memory, which is connected via an internal communication link to said central computer, said FR communication module and said ATM communication link;

wherein said internal communication link comprises two separate bus links for driving said FR communication module.

11. The device of claim 10, wherein said internal communication link comprises a bus link.

12. The device of claim 11, wherein said bus link comprises a Peripheral Component Interconnect (PCI) bus link.

13. The device of claim 10, wherein said central computer controls data transmission between said FR communication module, said ATM communication module, said central computer and said buffer memory.

14. The device of claim 10, wherein said buffer memory comprises a reception unit and a transmission unit.

15. A device for converting data sequences between frame relay (FR) format and asynchronous transfer mode (ATM) format, comprising:

an FR communication module for connecting to at least one FR communication link;

an ATM communication module for connecting to an ATM communication link;

a central computer for controlling said FR communication module and said ATM communication module;

a buffer memory, which is connected via an internal communication link to said central computer, said FR communication module and said ATM communication link; and an additional central computer which controls conversion of data sequences from the FR format into the ATM format;

wherein said additional central computer controls conversion of said data sequences from FR format into ATM format, and wherein said buffer memory comprises a reception unit and a transmission unit.

16. The device of claim 15, wherein said internal communication link comprises a bus link.

17. The device of claim 16, wherein said bus link comprises a PCI bus link.

18. The device of claim 15, wherein said central computer controls data transmission between said FR communication module, said ATM communication module, said central computer and said buffer memory.

19. The method of claim 8, wherein said internal communication link comprises a bus link.

20. The method of claim 19, wherein said bus link comprises a Peripheral Component Interconnect (PCI) bus link.

21. The method of claim 8, wherein said central computer controls data transmission between said FR communication module, said ATM communication module, said central computer and said buffer memory.

22. The method of claim 8, wherein said buffer memory comprises a reception unit and a transmission unit.

23. The method of claim 9, wherein said internal communication link comprises a bus link.

24. The method of claim 23, wherein said bus link comprises a Peripheral Component Interconnect (PCI) bus link.

25. The method of claim 9, wherein said central computer controls data transmission between said FR communication module, said ATM communication module, said central computer and said buffer memory.

26. The method of claim 9, wherein said buffer memory comprises a reception unit and a transmission unit.

* * * * *

UNITED STATES PATENT AND TRADEMARK OFFICE
CERTIFICATE OF CORRECTION

PATENT NO. : 6,870,853 B1
DATED : March 22, 2005
INVENTOR(S) : Ludwig Schweiger

It is certified that error appears in the above-identified patent and that said Letters Patent is hereby corrected as shown below:

Column 5,
Line 1, reads "readin"; replace with -- reading-in --.

Signed and Sealed this

Thirtieth Day of August, 2005

JON W. DUDAS
*Director of the United States Patent and Trademark Office*